(12) United States Patent
Tang

(10) Patent No.: US 11,324,021 B2
(45) Date of Patent: May 3, 2022

(54) DATA TRANSMISSION AND RELATED PRODUCT

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 229 days.

(21) Appl. No.: 16/621,229

(22) PCT Filed: Jun. 15, 2017

(86) PCT No.: PCT/CN2017/088527
§ 371 (c)(1),
(2) Date: Dec. 10, 2019

(87) PCT Pub. No.: WO2018/227512
PCT Pub. Date: Dec. 20, 2018

(65) Prior Publication Data
US 2020/0146030 A1 May 7, 2020

(51) Int. Cl.
*H04W 72/12* (2009.01)
*H04L 1/18* (2006.01)
(Continued)

(52) U.S. Cl.
CPC ....... *H04W 72/1257* (2013.01); *H04L 1/1819* (2013.01); *H04L 1/1874* (2013.01);
(Continued)

(58) Field of Classification Search
None
See application file for complete search history.

(56) References Cited

U.S. PATENT DOCUMENTS

| 2011/0103327 A1 | 5/2011 | Lee et al. | |
| 2011/0223924 A1* | 9/2011 | Lohr | H04L 1/1607 |
| | | | 455/450 |

(Continued)

FOREIGN PATENT DOCUMENTS

| CN | 101800991 A | 8/2010 |
| CN | 101868933 A | 10/2010 |

(Continued)

OTHER PUBLICATIONS

Canada First Office Action for CA Application 3064302 dated Jan. 7, 2021.
(Continued)

*Primary Examiner* — Saumit Shah
(74) *Attorney, Agent, or Firm* — Young Basile Hanlon & MacFarlane, P.C.

(57) ABSTRACT

A data transmission method and a related product are provided. The method includes: when a HARQ buffer is not empty, a user equipment selects a grant used for previous data transmission to transmit data that needs to be retransmitted; or, when the HARQ buffer is empty, the user equipment selects one current grant of Semi-Persistent scheduling to transmit new data or selects multiple current grants of Semi-Persistent scheduling to transmit new data according to a carrier access manner allowed by the user equipment.

17 Claims, 5 Drawing Sheets

(51) Int. Cl.
*H04L 5/00* (2006.01)
*H04W 24/08* (2009.01)
*H04W 72/14* (2009.01)

(52) U.S. Cl.
CPC ........... *H04L 5/0082* (2013.01); *H04W 24/08* (2013.01); *H04W 72/14* (2013.01)

(56) References Cited

U.S. PATENT DOCUMENTS

2018/0220440 A1* 8/2018 Dudda .................. H04L 1/1822
2019/0173533 A1* 6/2019 Kim .................. H04W 72/0453

FOREIGN PATENT DOCUMENTS

| CN | 102055570 | A  | 5/2011  |
| CN | 102447549 | A  | 5/2012  |
| CN | 104378185 | A  | 2/2015  |
| CN | 106788943 | A  | 5/2017  |
| RU | 2501193   | C1 | 12/2013 |
| WO | 2009044344 | A2 | 4/2009 |
| WO | 2010037289 | A1 | 4/2010 |

OTHER PUBLICATIONS

Communication pursuant to Article 94(3) EPC for EP Application 17913826.8 dated Jan. 22, 2021.
India First Examination Report for IN Application 201917051780 dated Mar. 5, 2021.
Chile First Office Action with English Translation for CL Application 2019003607 dated Feb. 18, 2021.
Korean Office Action with English Translation for KR Application 10-2019-7033767 dated Jun. 23, 2021. (10 pages).
Singapore First Written Opinion for SG Application 11201910832X dated May 4, 2021. (9 pages).
Russia First Office with English Translation for RU application 2019139983/07(078629) dated Oct. 15, 2020.
EP Search Report for EP Application No. 17913826.8 dated Apr. 17, 2020.
3GPP TSG-RAN WG2 Meeting #94 R2-163672; May 23-27, 2016, Nanjing, China; Text proposal to capture muting behaviour in 36.321; pp. 1-3.
Chile Office Action with English Translation for CL Application 2019-003607 dated Oct. 21, 2021. (20 pages).
Chinese Office Action with English Translation for CN Application 201780090341.4 dated Oct. 21, 2021. (16 pages).
Israel Office Action with English Translation for IL Application 270750 dated Dec. 30, 2021. (6 pages).
Singapore Invitation to Respond to Written Opinion for SG Application 11201910832X dated Jan. 5, 2022. (7 pages).

* cited by examiner

DATA TRANSMISSION AND RELATED PRODUCT

CROSS-REFERENCE TO RELATED APPLICATION(S)

This application is a 371 application of International Application No. PCT/CN2017/088527, filed on Jun. 15, 2017, the entire disclosure of which is hereby incorporated by reference.

TECHNICAL FIELD

The present disclosure relates to the technical field of communication, in particular to a data transmission method and a related product.

BACKGROUND

A Long Term Evolution (LTE) system uses shared resources to schedule user data. This scheduling method may utilize wireless communication resources to a great extent, but it requires large overhead of control information. In the LTE system, all voice services in a circuit domain are cancelled and are replaced by VoIP services in a data domain. However, as there are generally a large number of voice users and shared resources are used in LTE to schedule user data, and relevant control information is required for each transmission, the excessive overhead of control information limits the quantity of users that the LTE system may support at the same time. Therefore, a Semi-Persistent Scheduling (SPS) technology is introduced in LTE for real-time services with fixed packet sizes and regular arrival intervals. In short, Semi-Persistent scheduling means that in a scheduling and transmission process of LTE, an evolved Node B (eNB) indicates current scheduling information of a User Equipment (UE) through a Physical Downlink Control Channel (PDCCH) during initial scheduling. If it is identified to be Semi-Persistent scheduling by the UE, current scheduling information is saved, and the service data is sent or received at the same positions of time-frequency resources at fixed intervals.

In the LTE system, only one Semi-Persistent scheduling is allowed for the same UE, so the Semi-Persistent scheduling of the same UE will not conflict. At present, in a system with a 5-Generation (5G) mobile communication technology or a New Ratio interface (NR), it has been proposed that multiple Semi-Persistent schedulings may exist for the same UE. Then there may be conflicts among multiple Semi-Persistent schedulings of the same UE. Therefore, in 5G or NR, how to avoid conflicts among multiple Semi-Persistent schedulings of the same UE is a technical problem to be solved.

SUMMARY

Implementations of the present disclosure provide a data transmission method and a related product.

In a first aspect, an implementation of the present disclosure provides a data transmission method, which includes: when a hybrid automatic repeat request (HARQ) buffer is not empty, selecting, by a user equipment, an uplink resource grant used for previous data transmission to transmit data that needs to be retransmitted; or, when the HARQ buffer is empty, according to a carrier access manner allowed by the user equipment, selecting, by the user equipment, one current grant of Semi-Persistent scheduling to transmit new data or multiple current grants of Semi-Persistent scheduling to transmit new data.

In a second aspect, an implementation of the present disclosure provides a data transmission method, which includes: monitoring, by a network device, resources of a grant used by the user equipment for previous data transmission to obtain data that needs to be retransmitted through the grant used by the user equipment for previous data transmission when HARQ buffer is not empty; or, monitoring, by the network device, resources of one current grant of Semi-Persistent scheduling or multiple current grants of Semi-Persistent scheduling to obtain new data transmitted by the user equipment through the one current grant of Semi-Persistent scheduling or the multiple current grants of Semi-Persistent scheduling when the HARQ buffer is empty.

In a third aspect, an implementation of the present disclosure provides a user equipment, including a processing unit and a communication unit, wherein: the processing unit is used for, when a hybrid automatic repeat request (HARQ) buffer is not empty, selecting, through the communication unit, an uplink resource grant used for previous data transmission to transmit data that needs to be retransmitted; or, when the HARQ buffer is empty, according to a carrier access manner allowed by the user equipment, selecting, through the communication unit, one current grant of Semi-Persistent scheduling to transmit new data or multiple current grants of Semi-Persistent scheduling to transmit new data.

In a fourth aspect, an implementation of the present disclosure provides a network device, including a processing unit and a communication unit, wherein: the processing unit is used for monitoring, through the communication unit, resources of an uplink resource grant used by a user equipment for previous data transmission to obtain data that needs to be retransmitted transmitted through the grant used by the user equipment for previous data transmission when a hybrid automatic repeat request (HARQ) buffer is not empty; or monitoring, through the communication unit, resources of one current grant of Semi-Persistent scheduling or multiple current grants of Semi-Persistent scheduling to obtain new data transmitted by the user equipment through the one current grant of Semi-Persistent scheduling or the multiple current grants of Semi-Persistent scheduling when the HARQ buffer is empty.

In a fifth aspect, an implementation of the present disclosure provides a user equipment including one or more processors, one or more memories, one or more transceivers, and one or more programs; the one or more programs are stored in the one or more memories, and configured to be executed by the one or more processors; and the programs include instructions for performing the acts in the method according to the first aspect of the implementation of the present disclosure.

In a sixth aspect, an implementation of the present disclosure provides a network device including one or more processors, one or more memories, one or more transceivers, and one or more programs; the one or more programs are stored in the one or more memories, and configured to be executed by the one or more processors; and the programs include instructions for performing the acts in the method according to the second aspect of the implementation of the present disclosure.

In a seventh aspect, an implementation of the present disclosure provides a computer-readable storage medium storing a computer program for electronic data interchange.

The computer program enables a computer to perform the method according to the first aspect in the implementation of the present disclosure.

In an eighth aspect, an implementation of the present disclosure provides a computer-readable storage medium storing a computer program for electronic data interchange. The computer program enables a computer to perform the method according to the second aspect in the implementation of the present disclosure.

In a ninth aspect, an implementation of the present disclosure provides a computer program product. The computer program product includes a non-transitory computer-readable storage medium storing a computer program. The computer program is operable to enable a computer to perform the method according to the first aspect in the implementation of the present disclosure.

In a tenth aspect, an implementation of the present disclosure provides a computer program product. The computer program product includes a non-transitory computer-readable storage medium storing a computer program. The computer program is operable to enable a computer to perform the method according to the second aspect in the implementation of the present disclosure.

It can be seen that in the solution, when the HARQ buffer of the user equipment is not empty, the grant used for data retransmission is the same as that used for previous data transmission. In addition, when the HARQ buffer is empty, when the user equipment does not allow using multiple grants of Semi-Persistent scheduling to transmit data, the user equipment only selects one grant of Semi-Persistent scheduling to transmit data, and when the user equipment allows using multiple grants of Semi-Persistent scheduling to transmit data, the user equipment selects multiple grants of Semi-Persistent scheduling to transmit data.

These aspects and other aspects of the present disclosure will be more simply understood in following description of the implementations.

BRIEF DESCRIPTION OF DRAWINGS

In order to explain technical schemes of the implementations of the present disclosure more clearly, drawings referred to in the description of the implementations will be briefly introduced below. Obviously, the drawings in the following description are some implementations of the present disclosure. For those of ordinary skill in the art, other drawings may be obtained according to those drawings without paying an inventive effort.

DETAILED DESCRIPTION

Figure 1:
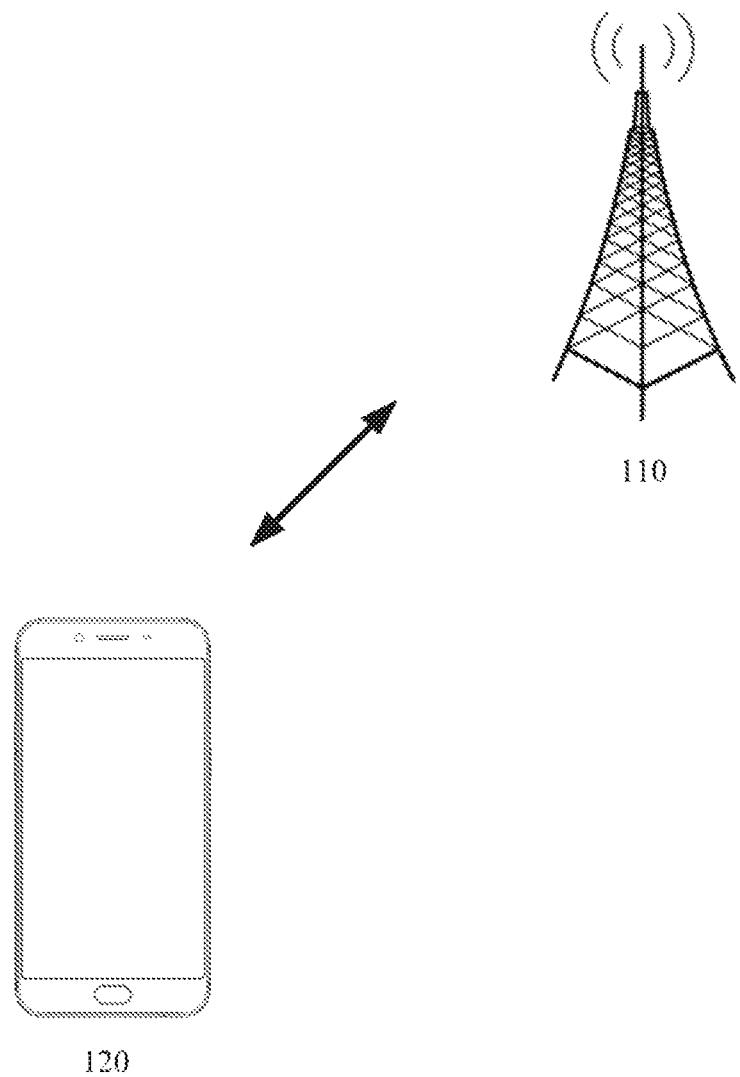
FIG. 1 is a schematic diagram of a network architecture provided in an implementation of the present disclosure.

The technical solutions of the present disclosure are clearly and completely described with reference to the accompanying drawings, in order to make the technical solutions of the present disclosure more clearly understood by those skilled in the art. The described implementations are only part, but not all, of the implementations of the present disclosure. Based on the implementations of the present disclosure, all other implementations acquired by those skilled in the art without creative work are within the scope of the present disclosure.

Details are given below separately.

The terms "first", "second", "third" and "fourth", or the like in the description, claims and drawings of the present disclosure are used to distinguish different objects and not used to describe a specific order. In addition, term "include" and "have" and any variations thereof are intended to cover non-exclusive inclusion. For example, a process, method, system, product, or device that includes a series of acts or units is not limited to the listed acts or units, but optionally also includes acts or units that are not listed, or optionally also includes other acts or units that are inherent to the process, method, product, or device.

The "implementation" mentioned in this disclosure means that a particular feature, structure, or characteristic described in combination with the implementation may be included in at least one implementation of the present disclosure. The appearance of the phrase in various places in the specification does not necessarily refer to the same implementation, nor is it an independent or alternative implementation mutually exclusive with other implementations. It is explicitly and implicitly understood by one skilled person in the art that implementations described in this disclosure may be combined with other implementations.

1) A User Equipment (UE) is a device that provides voice and/or data connectivity to users, such as a handheld device with a wireless connection function, a vehicle-mounted device. Common terminals include, for example, mobile phones, tablet computers, notebook computers, palm computers, mobile internet devices (MIDs), wearable devices such as smart watches, smart bracelets, pedometers, etc.

A network device refers to a node device on the network side. For example, the network device may be a Radio Access Network (RAN) device on an access network side in a cellular network. The so-called RAN device is a device that connects terminals to a wireless network, including but not limited to: an Evolved Node B (eNB), a radio network controller (RNC), a Node B (NB), a Base Station Controller (BSC), a Base Transceiver Station (BTS), a Home Base Station (e.g., a Home evolved NodeB, or a Home Node B, HNB), a BaseBand Unit (BBU). For another example, the network device may be a node device in a Wireless Local Area Network (WLAN), such as an access controller (AC), a gateway, or a WIFI Access Point (AP).

3) Semi-Persistent scheduling means that in a scheduling and transmission process, an eNB indicates current scheduling information of a user equipment through a Physical Downlink Control Channel (PDCCH) in initial scheduling, the user equipment stores the current scheduling information, and transmits or receives service data at the same positions of time-frequency resources at fixed intervals.

4) Dynamic scheduling refers to real-time and dynamic allocation of time-frequency resources and allowed transmission rate through a Media Access Control (MAC) layer (scheduler) during scheduling. Resource allocation is based on demand, and each scheduling requires interaction of scheduling signalings.

5) Non-adaptive retransmission means that HARQ does not need authorization, and a user equipment retransmits data according to the resources and the modulation and coding method used in the previous transmission.

6) Adaptive retransmission is retransmission that requires authorized transmission through PDCCH masked by SPS-C-RNTI (identification of Semi-Persistent Scheduling).

7) "Multiple" refers to two or more than two. "And/or" describes an association relationship of associated objects, indicating that there may be three relationships, for example, A and/or B may represent three situations: A alone, A and B at the same time, and B alone. Symbol "/" generally indicates that objects before and after the symbol "/" is in an "or" relationship.

Implementations of the present disclosure will be described below with reference to the accompanying drawings.

Please refer to FIG. 1, which is a schematic diagram of a network architecture disclosed in an implementation of the present disclosure. The network architecture shown in FIG. 1 includes a user equipment 110 and a network device 120. At present, in a 5G/NR system, it has been proposed that there may be multiple Semi-Persistent schedulings for the same user equipment, so there may be conflicts between multiple Semi-Persistent schedulings for the same user equipment. For example, assuming that a user equipment has two Semi-Persistent schedulings, the first Semi-Persistent scheduling starts transmission from the second ms and transmits one time every 3 ms, and positions of time-frequency resources occupied by the first Semi-Persistent scheduling are: 2, 5, 8, 11, and 14. The second Semi-Persistent scheduling starts transmission from the first ms and transmits one time every 4 ms, then positions of time-frequency resources occupied by the second Semi-Persistent scheduling are: 1, 5, 9, and 14. It can be seen that the first Semi-Persistent scheduling and the second Semi-Persistent scheduling conflict at the positions 5 and 14 of time-frequency resources.

In order to solve the problem, in the 5G/NR system, when a HARQ buffer of the user equipment 120 is not empty, the user equipment 120 selects a grant used for previous data transmission to transmit data that needs to be retransmitted. Since the grant used for data retransmission is the same as that used for previous data transmission, positions of time-frequency resources used for authorized scheduling are also the same. Since there is no problem of scheduling conflict in previous transmission, the grant used for the previous data transmission is used for retransmitting data, which may avoid conflicts among multiple Semi-Persistent schedulings of the same UE. In addition, when the HARQ buffer of the user equipment 120 is empty, according to an allowed carrier access manner, the user equipment 120 selects one current grant of Semi-Persistent scheduling to transmit new data or multiple current grants of Semi-Persistent scheduling to transmit new data. It can be seen that, when the user equipment 120 does not allow using multiple grants of Semi-Persistent scheduling to transmit data, the user equipment 120 only selects one grant of Semi-Persistent scheduling to transmit data, and when the user equipment 120 allows using multiple grants of Semi-Persistent scheduling to transmit data, the user equipment 120 selects multiple grants of Semi-Persistent scheduling to transmit data, thus avoiding conflicts among multiple Semi-Persistent schedulings of the same UE.

Next, a data transmission method provided in an implementation of the present disclosure will be described in detail in combination with the network architecture shown in FIG. 1.

Figure 2:
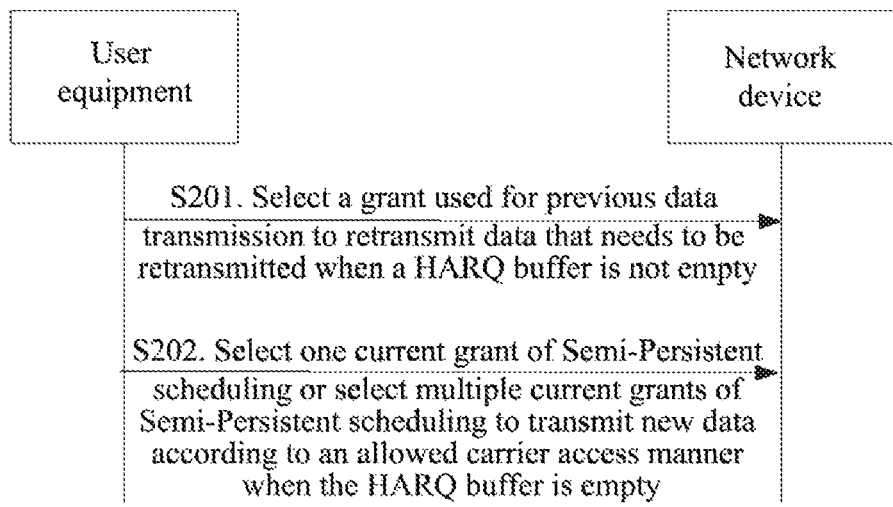
FIG. 2 is a schematic diagram of a flowchart of a data transmission method provided in an implementation of the present disclosure.

Please refer to FIG. 2. FIG. 2 is a schematic flowchart of a data transmission method provided in an implementation of the present disclosure, and the method includes following acts S201 and S202.

In act S201, when a HARQ buffer of a user equipment is not empty, the user equipment selects a grant used for previous data transmission to retransmit data that needs to be retransmitted; a network device monitors resources of the grant used by the user equipment for previous data transmission to obtain data that needs to be retransmitted transmitted by the user equipment through the grant used for previous data transmission when the HARQ buffer of the user equipment is not empty.

In an example, when a HARQ buffer is not empty and a grant of dynamic scheduling of a current Transmission Time Interval (TTI) has no New Data Indicator (NDI) that is not toggled, the user equipment selects the grant used for previous data transmission to transmit data that needs to be retransmitted.

Specifically, since a grant of dynamic scheduling has no NDI that is not toggled, it indicates that the user equipment is not required by a network to perform retransmission on the grant of dynamic scheduling. But since the HARQ buffer is not empty, it indicates that the user equipment needs to perform retransmission, the user equipment can only perform retransmission on Semi-Persistent resources (i.e., non-adaptive retransmission). In this case, if there are multiple Semi-Persistent resources, and the user equipment selects other Semi-Persistent resources for retransmission, there may be a possibility of TBS inconsistency, so the user equipment should select original Semi-Persistent resources for retransmission.

Further, when the HARQ buffer is not empty and a grant of dynamic scheduling of a current TTI has a New Data Indicator (NDI) that is not toggled, the user equipment selects a current grant of dynamic scheduling to transmit data that needs to be retransmitted.

Specifically, a grant of dynamic scheduling has an NDI that is not toggled, which indicates that the network wants the user equipment to perform retransmission, and specially sends one grant of dynamic scheduling to the user equipment, and wants the user equipment to perform retransmission (i.e., adaptive retransmission) on the grant of dynamic scheduling, thus avoiding disadvantages of Semi-Persistent resources (e.g., fixed resource allocation and MCS).

In one example, if the grant used for previous data transmission is one grant of Semi-Persistent scheduling, the user equipment selects the one grant of the Semi-Persistent scheduling to transmit data that needs to be retransmitted, and the network device monitors resources of the one grant of the Semi-Persistent scheduling to obtain the data that needs to be retransmitted transmitted by the user equipment.

If the grant used for previous data transmission is M grants of Semi-Persistent scheduling, the user equipment selects the M grants of Semi-Persistent scheduling to transmit the data that needs to be retransmitted, and the network device monitors resources of the M grants of Semi-Persistent scheduling to obtain the data that needs to be retransmitted transmitted by the user equipment, wherein the M is an integer greater than 1.

Specifically, the HARQ buffer of the user equipment being not empty indicates there are data not successfully received by the network device among data sent by the user equipment to the network device, and the user equipment needs to retransmit the data not successfully received by the network device to the network device. In the 5G/NR system, the user equipment selects the grant of the Semi-Persistent Scheduling used for previous data transmission to transmit the data that needs to be retransmitted. For example, the user equipment sends data packets 1 to 10 to the network device, wherein the data packets 2 and 3 have not been successfully received by the network device. If the grant of the Semi-Persistent Scheduling used by the user equipment to transmit data before includes grant 1 only, the user equipment selects grant 1 to transmit data packet 2 and data packet 3. If the grant of the Semi-Persistent Scheduling used by the user equipment for previous data transmission includes grant 2 and grant 3, the user equipment selects grant 2 and grant 3 to transmit data packet 2 and data packet 3. When there are multiple grants of Semi-Persistent scheduling used by the user equipment for previous data transmission, resources of the multiple grants of Semi-Persistent scheduling will not conflict.

It can be seen that since the grant used for data retransmission is the same as that used for previous data transmission, positions of time-frequency resources used for authorized scheduling are also the same. Since there is no problem of scheduling conflict in previous transmission, the grant used for the previous data transmission is used for retransmitting data, which may avoid conflicts among multiple Semi-Persistent schedulings of the same UE.

Further, there are multiple grants of Semi-Persistent scheduling used by the user equipment for previous data transmission, and there are multiple data that needs to be retransmitted. If a grant of Semi-Persistent scheduling used for transmitting data i before is grant 1, the user equipment selects grant 1 to transmit data i, wherein the data i is one of multiple data that needs to be retransmitted, and grant 1 is one of the multiple grants of Semi-Persistent scheduling used by the user equipment for previous data transmission. For example, the user equipment sends data packets 1 to 10 to the network device, wherein the data packets 2 and 3 have not been successfully received by the network device. The grant of the Semi-Persistent Scheduling used by the user equipment to transmit data includes grant 2 and grant 3. The user equipment used grant 2 to transmit data packet 2 and the user equipment used grant 3 to transmit data packet 3 before. In case of retransmission, the user equipment also uses grant 2 to retransmit data packet 2 and the user equipment also uses grant 3 to retransmit data packet 3.

Further, there are multiple grants of Semi-Persistent scheduling used by the user equipment for previous data transmission, and there are multiple data that needs to be retransmitted. If a grant of Semi-Persistent scheduling used for transmitting data i before is grant 1, the user equipment selects a grant other than grant 1 among the multiple grants of Semi-Persistent scheduling to transmit data i, wherein the data i is one of multiple data that needs to be retransmitted, and the grant 1 is one of the multiple grants of Semi-Persistent scheduling used by the user equipment for previous data transmission. For example, the user equipment sends data packets 1 to 10 to the network device, wherein the data packets 2 and 3 have not been successfully received by the network device. The grant of the Semi-Persistent Scheduling used by the user equipment to transmit data before includes grant 2 and grant 3. The user equipment used grant 2 to transmit data packet 2 and used grant 3 to transmit data packet 3 before. In case of retransmission, the user equipment also uses grant 3 to retransmit data packet 2 and the user equipment also uses grant 2 to retransmit data packet 3.

Or, in act S202, when the HARQ buffer is empty, the user equipment selects one current grant of Semi-Persistent scheduling to transmit new data or selects multiple current grants of Semi-Persistent scheduling to transmit new data according to a carrier access manner allowed by the user equipment; the network device monitors resources of the one current grant of Semi-Persistent scheduling or the multiple current grants of Semi-Persistent scheduling to obtain the new data transmitted by the user equipment through the one current grant of Semi-Persistent scheduling or the multiple current grants of Semi-Persistent scheduling when the HARQ buffer of the user equipment is empty.

In an example, when the HARQ buffer is empty, there are currently N grants of Semi-Persistent scheduling and the user equipment is not allowed to use a non-single carrier access manner, the user equipment selects one of the N grants of Semi-Persistent scheduling to transmit new data, and the network device monitors resources of the N grants of Semi-Persistent scheduling to obtain the new data transmitted by the user equipment, wherein the N is an integer greater than 1.

When the HARQ buffer is empty, there are currently N grants of Semi-Persistent scheduling and the user equipment is allowed to use a non-single carrier access manner, the user equipment selects multiple grants among the N grants of Semi-Persistent scheduling to transmit new data, and the network device monitors resources of the N grants of Semi-Persistent scheduling to obtain the new data transmitted by the user equipment.

Specifically, the HARQ buffer of the user equipment being empty indicates that the user equipment has no data to retransmit to the network device. In the 5G/NR system, if the user equipment currently has N grants of Semi-Persistent scheduling, but a current situation of the user equipment does not allow the user equipment to use the non-single carrier access manner (the non-single carrier access manner requires better transmission power and higher signal-to-noise ratio than the single carrier access manner, and an anti-interference capability of the non-single carrier access manner is not as good as that of the single carrier access manner; assuming that the user equipment is at an edge of a cell, since a current network situation of the user equipment is not good, the current situation of the user equipment does not allow the user equipment to use the non-single carrier access manner), the user equipment selects one grant from the N grants of Semi-Persistent scheduling to transmit new data. If the user equipment currently has N grants of Semi-Persistent scheduling and the current situation of the user equipment allows the user equipment to use a non-single carrier access manner, the user equipment selects multiple grants from the N grants of Semi-Persistent scheduling to transmit new data.

It can be seen that, when the user equipment does not allow using multiple grants of Semi-Persistent scheduling to transmit data, the user equipment only selects one grant of Semi-Persistent scheduling to transmit data, and when the user equipment allows using multiple grants of Semi-Persistent scheduling to transmit data, the user equipment selects multiple grants of Semi-Persistent scheduling to transmit data, thus avoiding conflicts among multiple Semi-Persistent schedulings of the same UE.

Further, the user equipment selects multiple grants from the N grants of Semi-Persistent scheduling to transmit new data, and the multiple grants may be multiple grants with adjacent positions of time-frequency resources. For example, N grants of Semi-Persistent scheduling include grant 1, grant 2, grant 3, grant 4, and grant 5, positions of time-frequency resources of grant 2, grant 3, and grant 4 are adjacent, then the user equipment selects grant 2, grant 3, and grant 4 to transmit new data.

Further, the user equipment selects multiple grants from the N grants of Semi-Persistent scheduling to transmit new data, and the multiple grants may be multiple grants whose transmission-block sizes (TBSs) exceed a preset threshold. For example, among the N grants of Semi-Persistent scheduling, there are grant 1, grant 2, grant 3, grant 4, and grant 5, and among these 5 grants, there are grant 2, grant 3, and grant 4 whose TBSs exceed the preset threshold, then the user equipment selects grant 2, grant 3 and grant 4 to transmit new data.

In an example, the user equipment selects one grant with the largest TBS among N grants of Semi-Persistent scheduling to transmit new data, and the network device monitors resources of the one grant with the largest TBS among the N grants of Semi-Persistent scheduling to obtain the new data transmitted by the user equipment. For example, among N grants of Semi-Persistent scheduling, there are grant 1, grant 2, grant 3, grant 4, and grant 5. Among these 5 grants, a grant with the largest TBS is grant 5, so the user equipment selects grant 5 to transmit new data.

Specifically, when the user equipment has multiple grants of Semi-Persistent scheduling, if the network device does not know which grant the user equipment uses to transmit data, the network device will monitor resources of N grants of Semi-Persistent scheduling, thus consumption of network device is large. Therefore, it is agreed in advance that when the user equipment can only select one grant of Semi-Persistent scheduling to transmit data, the grant with the largest TB S will be selected, and the network device will only monitor resources of the grant with the largest TBS, thus reducing overhead of the network device.

In an example, the user equipment selects a grant with the largest or smallest index among the N grants of Semi-Persistent scheduling to transmit new data, and the network device monitors resources of the grant with the largest or smallest index among the N grants of Semi-Persistent scheduling to obtain new data transmitted by the user equipment. For example, N grants of Semi-Persistent scheduling include grant 1, grant 2, grant 3, grant 4, and grant 5, and indexes of these 5 grants are 1-5 respectively, then the grant with the largest Index is grant 5, and the grant with the smallest index is grant 1, then the user equipment selects grant 1 or grant 5 to transmit new data.

Specifically, when the user equipment has multiple grants of Semi-Persistent scheduling, if the network device does not know which grant the user equipment uses to transmit data, the network device will monitor resources of N grants of Semi-Persistent scheduling, thus consumption of network device is large. Therefore, it is agreed in advance that when the user equipment can only select one grant of Semi-Persistent scheduling to transmit data, the grant with the largest or smallest index will be selected, and the network device will only monitor resources of the grant with the largest or smallest index, thus reducing the overhead of the network device.

In an example, when the HARQ buffer is empty and there is currently a grant of dynamic scheduling, the user equipment selects the current grant of dynamic scheduling to transmit new data, and the network device monitors resources of the current grant of dynamic scheduling to obtain new data transmitted by the user equipment. Since dynamic scheduling may be adjusted in real time, if the user equipment currently has a grant of dynamic scheduling, the user equipment selects the grant of dynamic scheduling to transmit new data, which may ensure that resources do not conflict.

Figure 3:
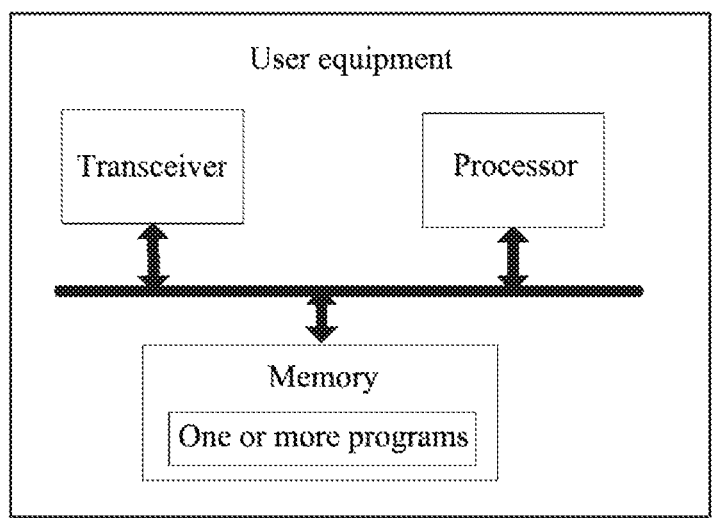
FIG. 3 is a schematic diagram of structure of a user equipment provided in an implementation of the present disclosure.

Please refer to FIG. 3, which shows a user equipment 300 provided in an implementation of the present disclosure, including one or more processors, one or more memories, one or more transceivers, and one or more programs.

The one or more programs are stored in the one or more memories, and configured to be executed by the one or more processors.

The program includes instructions for performing following acts: when a hybrid automatic repeat request (HARQ) buffer is not empty, an uplink resource grant used for previous data transmission is selected to transmit the data that needs to be retransmitted; or, when the HARQ buffer is empty, according to a carrier access manner allowed by the user equipment, a current grant of Semi-Persistent scheduling is selected to transmit new data or multiple current grants of Semi-Persistent scheduling are selected to transmit new data.

In one example, the program specifically includes instructions for performing following acts: when the HARQ buffer is empty, there are currently N grants of Semi-Persistent scheduling, and the user equipment is not allowed to use a non-single carrier access manner, selecting one of the N grants of Semi-Persistent scheduling to transmit new data, wherein the N is an integer greater than 1; when the HARQ buffer is empty, there are currently N grants of Semi-Persistent scheduling, and the user equipment is allowed to use a non-single carrier access manner, multiple grants among the N grants of Semi-Persistent scheduling are selected to transmit new data.

In an example, the program also includes instructions for performing following acts: when the HARQ buffer is empty and there is currently a grant of dynamic scheduling, the current grant of dynamic scheduling is selected to transmit new data.

In one example, the program specifically includes instructions for performing following acts: selecting one grant with the largest transmission block size (TB S) among the N grants of Semi-Persistent scheduling to transmit new data.

In one example, the program specifically includes instructions for performing following acts: selecting one grant with the largest index or the smallest index among the N grants of Semi-Persistent scheduling to transmit new data.

In one example, the program specifically includes instructions for performing following acts: when the HARQ buffer is not empty and a grant of dynamic scheduling of a current Transmission Time Interval (TTI) has no New Data Indicator (NDI) that is not toggled, selecting a grant used for previous data transmission to transmit data that needs to be retransmitted.

In an example, the program also includes instructions for performing following acts: when the HARQ buffer is not empty and a grant of dynamic scheduling of a current TTI has a New Data Indicator (NDI) that is not toggled, selecting a current grant of dynamic scheduling to transmit data that needs to be retransmitted.

It can be seen that in the solution, when the HARQ buffer of the user equipment is not empty, the grant used for data retransmission is the same as that used for previous data transmission, thus avoiding conflicts among multiple Semi-Persistent schedulings of the same UE. In addition, when the HARQ buffer is empty, when the user equipment does not allow using multiple grants of Semi-Persistent scheduling to transmit data, the user equipment only selects one grant of Semi-Persistent scheduling to transmit data, and when the user equipment allows using multiple grants of Semi-Persistent scheduling to transmit data, the user equipment selects multiple grants of Semi-Persistent scheduling to transmit data, thus avoiding conflicts among multiple Semi-Persistent schedulings of the same UE.

Figure 4:
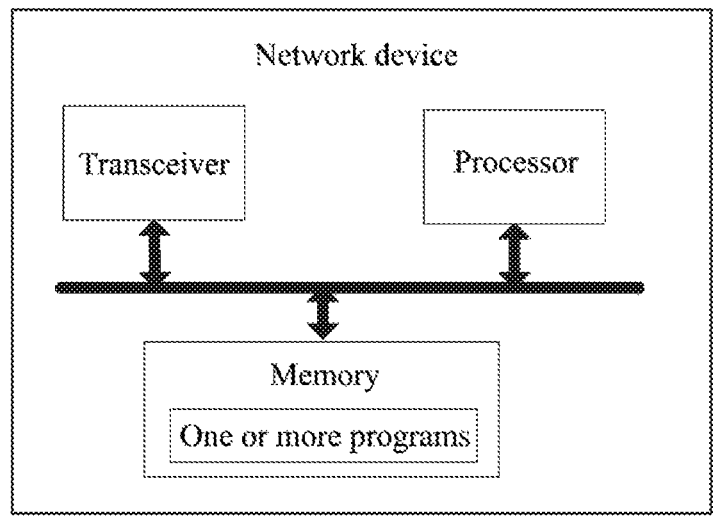
FIG. 4 is a schematic diagram of structure of a network device provided in an implementation of the present disclosure.

Please refer to FIG. 4, which shows a network device 400 provided in an implementation of the present disclosure, including one or more processors, one or more memories, one or more transceivers, and one or more programs.

The one or more programs are stored in the one or more memories, and configured to be executed by the one or more processors.

The program includes instructions for performing following acts: monitoring resources of an uplink resource grant used by a user equipment for previous data transmission to obtain data that needs to be retransmitted transmitted by the user equipment through the grant used for transmitting data before when a hybrid automatic repeat request (HARQ) buffer is not empty; or, monitoring resources of one current grant of Semi-Persistent scheduling or multiple current grants of Semi-Persistent scheduling to obtain new data transmitted by the user equipment through the one current grant of Semi-Persistent scheduling or the multiple current grants of Semi-Persistent scheduling when the HARQ buffer is empty.

In an example, the program also includes instructions for performing following acts: monitoring resources of a current grant of dynamic scheduling to obtain new data transmitted by the user equipment through the current grant of dynamic scheduling when the HARQ buffer is empty and there is a current grant of dynamic scheduling.

In an example, when there are currently N grants of Semi-Persistent scheduling, and the N is an integer greater than 1, the program specifically includes instructions for performing following acts: monitoring resources of one grant with the largest transmission block size (TB S) among the current N grants of Semi-Persistent scheduling.

In an example, when there are currently N grants of Semi-Persistent scheduling, and the N is an integer greater than 1, the program specifically includes instructions for performing following acts: monitoring resources of one grant with the largest index or the smallest index among the current N grants of Semi-Persistent scheduling.

In an example, the program also includes instructions for performing following acts: monitoring resources of a current grant of dynamic scheduling to obtain data that needs to be retransmitted transmitted by the user equipment through the current grant of dynamic scheduling when the HARQ buffer is not empty and the grant of dynamic scheduling of the current transmission time interval (TTI) has an NDI that is not toggled.

It can be seen that in the solution, when the HARQ buffer of the user equipment is not empty, the grant used for data retransmission is the same as that used for previous data transmission, thus avoiding conflicts among multiple Semi-Persistent schedulings of the same UE. In addition, when the HARQ buffer is empty, when the user equipment does not allow using multiple grants of Semi-Persistent scheduling to transmit data, the user equipment only selects one grant of Semi-Persistent scheduling to transmit data, and when the user equipment allows using multiple grants of Semi-Persistent scheduling to transmit data, the user equipment selects multiple grants of Semi-Persistent scheduling to transmit data, thus avoiding conflicts among multiple Semi-Persistent schedulings of the same UE.

Figure 5:
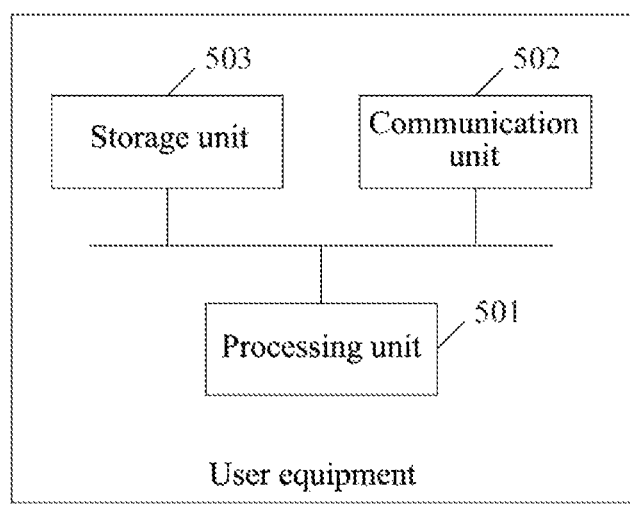
FIG. 5 is a schematic diagram of structure of another user equipment provided in an implementation of the present disclosure.

Refer to FIG. 5, which is a schematic diagram of structure of a user equipment 500 provided in an implementation of the present disclosure. The user equipment 500 includes a processing unit 501, a communication unit 502 and a storage unit 503, wherein: the processing unit 501 is used for, when a hybrid automatic repeat request (HARQ) buffer is not empty, selecting, through the communication unit 502, an uplink resource grant used for previous data transmission to transmit data that needs to be retransmitted; or, when the HARQ buffer is empty, according to a carrier access manner allowed by the user equipment, selecting, through the communication unit 502, one current grant of Semi-Persistent scheduling to transmit new data or multiple current grants of Semi-Persistent scheduling to transmit new data.

The processing unit 501 may be a processor or a controller (e.g., may be a Central Processing Unit (CPU), a general-purpose processor, a Digital Signal Processor (DSP), An Application-Specific Integrated Circuit (ASIC), a Field Programmable Gate Array (FPGA), or other programmable logic device, a transistor logic device, a hardware component, or any combination thereof. The processing unit may implement or execute various illustrative logical blocks, modules, and circuits described in connection with the disclosure of the present disclosure. The processor may also be a combination that implements computing functions, e.g., a combination that includes one or more microprocessors, a combination of a DSP and a microprocessor, etc.). The communication unit 502 may be a transceiver, a transceiver circuit, a radio frequency chip, a communication interface, etc., and the storage unit 503 may be a memory.

When the processing unit 501 is a processor, the communication unit 502 is a communication interface, and the storage unit 503 is a memory, the user equipment related to the implementation of the present disclosure may be the user equipment shown in FIG. 3.

Figure 6:
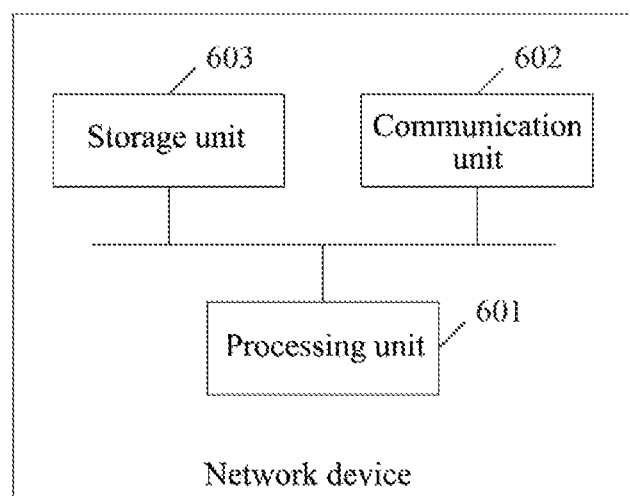
FIG. 6 is a schematic diagram of structure of another network device provided in an implementation of the present disclosure.

Refer to FIG. 6, which is a schematic diagram of structure of a network device 600 provided in the present implementation. The network device 600 includes a processing unit 601, a communication unit 602, and a storage unit 603, wherein: the processing unit 601 is used for monitoring, through the communication unit 602, resources of an uplink resource grant used by a user equipment for previous data transmission to obtain data that needs to be retransmitted transmitted through the grant used by the user equipment for previous data transmission when a hybrid automatic repeat request (HARQ) buffer is not empty; or monitoring, through the communication unit 602, resources of one current grant of Semi-Persistent scheduling or multiple current grants of Semi-Persistent scheduling to obtain new data transmitted by the user equipment through the one current grant of Semi-Persistent scheduling or the multiple current grants of Semi-Persistent scheduling when the HARQ buffer is empty.

The processing unit 601 may be a processor or a controller (e.g., may be a Central Processing Unit (CPU), a general-purpose processor, a Digital Signal Processor (DSP), An Application-Specific Integrated Circuit (ASIC), a Field Programmable Gate Array (FPGA), or other programmable logic device, a transistor logic device, a hardware component, or any combination thereof. The processing unit may implement or execute various illustrative logical blocks, modules, and circuits described in connection with the disclosure of the present disclosure. The processor may also be a combination that implements computing functions, e.g., a combination that includes one or more microprocessors, a combination of a DSP and a microprocessor, etc.). The communication unit 602 may be a transceiver, a transceiver circuit, a radio frequency chip, a communication interface, etc., and the storage unit 603 may be a memory.

When the processing unit 601 is a processor, the communication unit 602 is a communication interface, and the storage unit 603 is a memory, the network device related to the implementation of the present disclosure may be the network device shown in FIG. 4.

Figure 7:
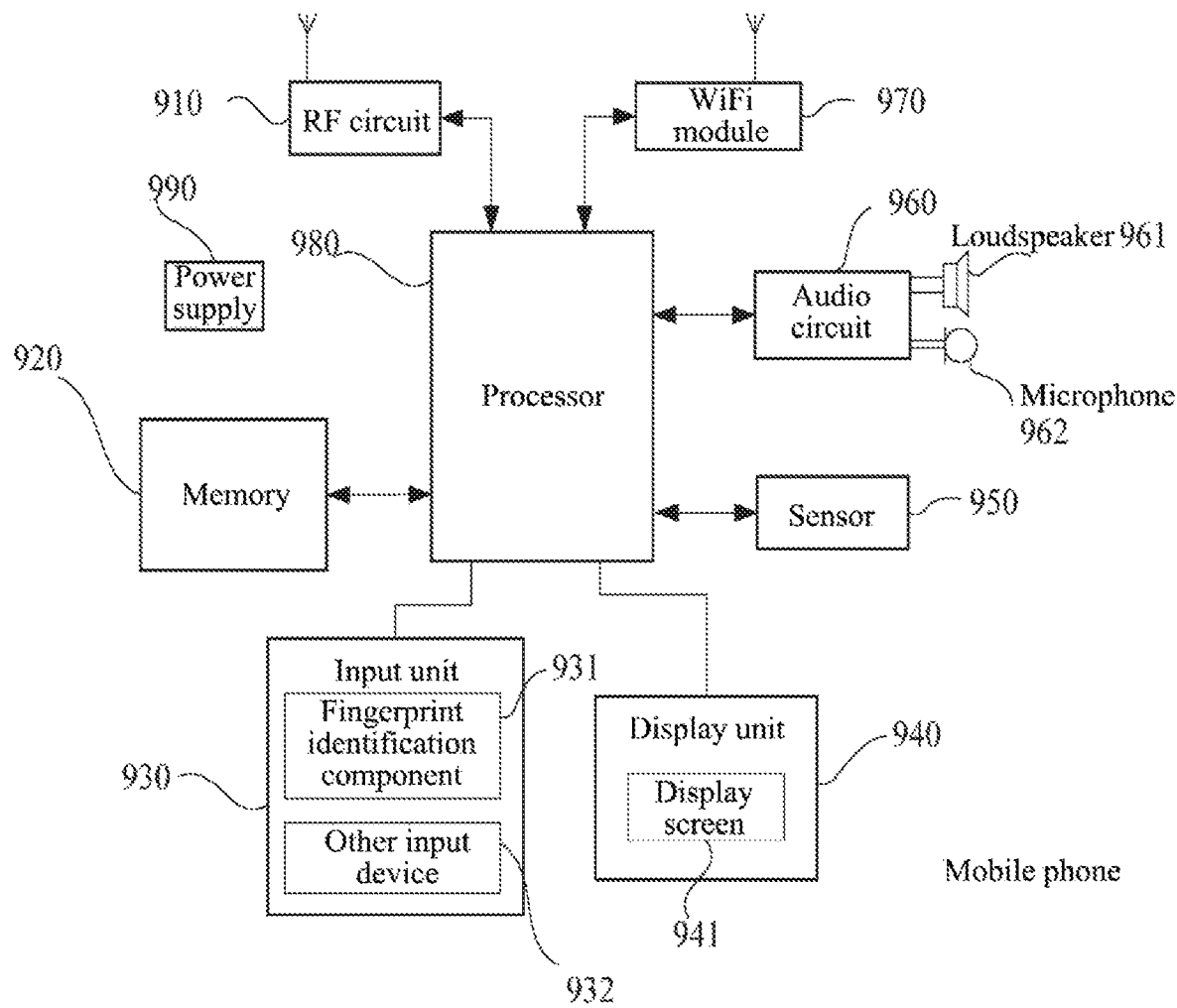
FIG. 7 is a schematic diagram of structure of another user equipment provided in an implementation of the present disclosure.

Another user equipment is further provided in an implementation of the present disclosure. As illustrated in FIG. 7, for ease of illustration, only parts related to the implementation of the present disclosure are shown, and specific technical details which are not illustrated may refer to parts of the method according to the implementation of the present disclosure. The user equipment may be a mobile phone, a tablet computer, a Personal Digital Assistant (PDA), a Point of Sales (POS), a vehicle-mounted computer, or any other user equipment. A mobile phone is taken as an example of the user equipment in following contents.

FIG. 7 is a block diagram of a partial structure of a mobile phone related to the user equipment provided by the implementation of the present disclosure. Referring to FIG. 7, the mobile phone includes parts such as a radio frequency (RF) circuit 910, a memory 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 7 does not constitute a limitation to the mobile phone, and the mobile phone may include more parts or fewer parts than those shown in the figure, or some parts may be combined, or a different part arrangement may be used.

In the following, each composition part of the mobile phone is specifically described with reference to FIG. 7.

The RF circuit 910 may be used to receive and send information. Generally, the RF circuit 910 includes, but is not limited to, an antenna, at least one amplifier, a transceiver, a coupler, a Low Noise Amplifier (LNA), a duplexer, and the like. In addition, the RF circuit 910 may further communicate with a network and another device via wireless communication. The wireless communication may use any communication standard or protocol, which includes, but is not limited to, a Global System for Mobile Communication (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be used for storing software programs and modules, and the processor 980 runs the software programs and modules stored in the memory 920 to execute various functional applications and data processing of the mobile phone. The memory 920 may mainly include a program storage area and a data storage area, wherein the program storage area may store an operating system, a computer program required for at least one function, and the like. The data storage area may store data or the like created according to the use of the mobile phone. In addition, the memory 920 may include a high speed random access memory, and may also include a non-transitory memory, such as at least one magnetic disk storage device, a flash memory, or other volatile solid-state storage device.

The input unit 930 may be used for receiving input digital or character information, and generating key signal inputs related to user settings and function control of the mobile phone. Specifically, the input unit 930 may include a fingerprint identification component 931 and other input device 932. The fingerprint identification component 931 may collect fingerprint data inputted by the user thereon. Besides the fingerprint identification component 931, the input unit 930 may further include other input device 932. Specifically, the other input devices 932 may include, but is not limited to, one or more of a touch control screen, a physical keyboard, a function key (for example, a volume control key, or a switch key), a track ball, a mouse, a joystick, and so on.

The display unit 940 may be used for displaying information input by the user or information provided for the user, and various menus of the mobile phone. The display unit 940 may include a display screen 941. Optionally, the display screen 941 may be configured by a Liquid Crystal Display (LCD), an Organic Light-Emitting Diode (OLED), or the like. Although the fingerprint identification component 931 and the display screen 941 in FIG. 7 are used as two separate parts to realize the input and input function of the mobile phone, in some implementations, the fingerprint identification component 931 and the display screen 941 may be integrated to realize the input function and playing function of the mobile phone.

The mobile phone may further include at least one sensor 950, such as an optical sensor, a motion sensor or other sensor. Specifically, the optical sensor may include an ambient light sensor and a proximity sensor, where the ambient light sensor may adjust the luminance of the display screen 941 according to brightness of the ambient light, and the proximity sensor may turn off the display screen 941 and/or backlight when the mobile phone is moved to the ear. As one type of the motion sensor, an acceleration sensor may detect the magnitudes of accelerations in various directions (generally triaxial), may detect the magnitude and direction of the gravity when the sensor is still, may be used in an application for identifying a gesture of a mobile phone (for example, switching between landscape and portrait, related games, and gesture calibration of a magnetometer), and a function related to vibration identification (such as a pedometer and a tap) etc. Other sensors, for example, a gyroscope, a barometer, a hygrometer, a thermometer, and an infrared sensor, which may be configured in the mobile phone are not further described herein.

An audio circuit 960, a loudspeaker 961, and a microphone 962 may provide audio interfaces between the user and the mobile phone. The audio circuit 960 may transmit electrical signals converted from the received audio data to the speaker 961, and the speaker 961 may convert the electrical signals into sound signals for playing. On the other hand, the microphone 962 converts the collected sound signals into electrical signals, which are received by the audio circuit 960 and then converted into audio data. After being processed by the audio data playback processor 980, the audio data is sent to another mobile phone via the RF circuit 910, or the audio data is played to the memory 920 for further processing.

WiFi belongs to a short-range wireless transmission technology. The mobile phone may help users to send and receive e-mails, browse web pages and access streaming media and the like through WiFi module 970. The WiFi module 970 provides users with wireless broadband Internet access. Although FIG. 7 shows the WiFi module 970, it may be understood that, the WiFi module 970 is not an essential part of the mobile phone, and may be completely omitted as required without changing the essence of the present disclosure.

The processor 980 is a control center of the mobile phone, and connects various parts of a whole mobile phone by using various interfaces and circuits. By running or executing software programs and/or modules stored in the memory 920 and invoking data stored in the memory 920, the processor 680 performs various functions of the mobile phone and processes data, thereby performing overall monitoring on the mobile phone. Optionally, the processor 980 may include one or multiple processing units. Preferably, the processor 980 may integrate an application processor and a modulation and demodulation processor, where the application processor mainly processes the operating system, user interface, application program, and so on, and the modulation and demodulation processor mainly processes wireless communication. It may be understood that, the foregoing modem processor may be not integrated into the processor 980.

The mobile phone further includes the power supply 990 (such as a battery) for supplying power to each part. Preferably, the power supply may be logically connected to the processor 980 by using a power management system, thereby implementing functions such as charging, discharging, and power consumption management by using the power management system.

Although not shown in the figure, the mobile phone may further include a camera, a Bluetooth module, and the like, which are not further described herein.

In the implementation shown in FIG. 2, the flow at the user equipment side in each act of the method may be implemented based on the structure of the mobile phone.

In the implementation shown in FIG. 5, the function of each unit may be implemented based on the structure of the mobile phone.

An implementation of the present disclosure also provides a computer readable storage medium. The computer readable storage medium stores a computer program for electronic data interchange, and the computer program causes a computer to execute parts or all of the acts described for the user equipment in the method implementations.

An implementation of the present disclosure also provides a computer readable storage medium. The computer readable storage medium stores a computer program for electronic data interchange, and the computer program causes a computer to execute parts or all of the acts described for the network device in the method implementations.

An implementation of the present disclosure also provides a computer program product. The computer program product includes a non-transitory computer readable storage medium storing a computer program, and the computer program is operable to cause a computer to execute parts or all of the acts described for the user equipment in the method. The computer program product may be a software installation package.

An implementation of the present disclosure also provides a computer program product. The computer program product includes a non-transitory computer readable storage medium storing a computer program, and the computer program is operable to cause a computer to execute parts or all of the acts described for the network device in the method implementations. The computer program product may be a software installation package.

The acts of the method or algorithm described in implementations of the present disclosure may be implemented in hardware, or implemented in a manner of executing software instructions by a processor. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to a processor such that the processor may read information from the storage medium, and write information to the storage medium. Of course, the storage medium may be a component of the processor. The processor and the storage medium may be located in an ASIC. In addition, the ASIC may be located in an access network device, a target network device, or a core network device. The processor and the storage medium may also act as separate components in the access network device, the target network device, or the core network device.

Those skilled in the art should realize that in one or more examples described above, the functions described in the implementations of the present disclosure may be implemented in whole or in parts through software, hardware, firmware, or any combination thereof. When the functions described in the implementations of the present disclosure are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present disclosure. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired manner (e.g., a coaxial cable, an optical fiber, a Digital Subscriber Line (DSL)) or a wireless manner (e.g., infrared radiation, radio, microwave, etc.). The computer-readable storage medium may be any available medium that the computer may access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above have further explained in detail the purpose, technical solutions and beneficial effects of the implementations of the present disclosure. It should be understood that the above is only the specific implementations of the implementations of the present disclosure and is not used for limiting the protection scope of the implementations of the present disclosure. Any modification, equivalent substitution, improvement, etc. made on the basis of the technical solutions of the implementations of the present disclosure shall be included in the protection scope of the implementations of the present disclosure.

What is claimed is:

1. A method for data transmission, comprising:
when a hybrid automatic repeat request (HARQ) buffer is not empty, selecting, by a user equipment, an uplink resource grant used for previous data transmission to transmit data that needs to be retransmitted; or,
when the HARQ buffer is empty, according to a carrier access manner allowed by the user equipment, selecting, by the user equipment, one current grant of Semi- Persistent scheduling to transmit new data or multiple current grants of Semi-Persistent scheduling to transmit new data, wherein the according to the carrier access manner allowed by the user equipment, selecting, by the user equipment, one current grant of Semi-Persistent scheduling to transit new data or multiple current grants of Semi-Persistent scheduling to transmit new data, comprises:

when the HARQ buffer is empty, there are currently N grants of Semi-Persistent scheduling, and the user equipment is not allowed to use a non-single carrier access manner, selecting, by the user equipment, one of the N grants of Semi-Persistent scheduling to transmit new data, wherein the N is an integer greater than 1; and when the HARQ buffer is empty, there are currently N grants of Semi-Persistent scheduling, and the user equipment is allowed to use a non-single carrier access manner, selecting, by the user equipment, multiple grants among the N grants of Semi-Persistent scheduling to transmit new data.

2. The method according to claim 1, further comprising:
when the HARQ buffer is empty and there is currently a grant of dynamic scheduling, selecting, by the user equipment, the current grant of dynamic scheduling to transmit new data.

3. The method according to claim 1, wherein the selecting, by the user equipment, one of the N grants of Semi-Persistent scheduling to transmit new data comprises:
selecting, by the user equipment, one grant with the largest transmission block size (TBS) among the N grants of Semi-Persistent scheduling to transmit new data.

4. The method according to claim 1, wherein the selecting, by the user equipment, one of the N grants of Semi-Persistent scheduling to transmit new data, comprises:
selecting, by the user equipment, one grant with the largest or smallest index among the N grants of Semi-Persistent scheduling to transmit new data.

5. The method according to claim 1, wherein the selecting, by the user equipment, the grant used for previous data transmission to transmit data that needs to be retransmitted comprises:
when the HARQ buffer is not empty and a grant of dynamic scheduling of a current Transmission Time Interval (TTI) has no New Data Indicator (NDI) that is not toggled, selecting, by the user equipment, the grant used for previous data transmission to transmit data that needs to be retransmitted.

6. The method according to claim 5, wherein the method further comprises:
when the HARQ buffer is not empty and the grant of dynamic scheduling of the current TTI has an NDI that is not toggled, selecting, by the user equipment, the current grant of dynamic scheduling to transmit data that needs to be retransmitted.

7. The method according to claim 5, wherein the selecting, by the user equipment, the grant used for previous data transmission to transmit data that needs to be retransmitted comprises:
when the grant used for previous data transmission is one grant of Semi-Persistent scheduling, selecting, by the user equipment, the one grant of Semi-Persistent scheduling to transmit data that needs to be retransmitted; and when the grant used for previous data transmission is M grants of Semi-Persistent scheduling, selecting, by the user equipment, the M grants of Semi-Persistent scheduling to transmit data that needs to be retransmitted, wherein the M is an integer greater than 1.

8. A non-transitory computer-readable storage medium, wherein the non-transitory computer-readable storage medium stores a computer program for electronic data interchange, wherein the computer program enables a computer to perform the method according to claim 1.

9. A method for data transmission, comprising:
monitoring, by a network device, resources of an uplink resource grant used by a user equipment for previous data transmission to obtain data that needs to be retransmitted transmitted by the user equipment through the grant used for previous data transmission when a hybrid automatic repeat request (HARQ) buffer is not empty; or, monitoring, by the network device, resources of one current grant of Semi-Persistent scheduling or multiple current grants of Semi-Persistent scheduling to obtain new data transmitted by the user equipment through the one current grant of Semi-Persistent scheduling or the multiple current grants of Semi-Persistent scheduling when the HARQ buffer is empty, wherein when there are currently N grants of Semi-Persistent scheduling, and the N is an integer greater than 1, the monitoring, by the network device, the resources of the one current grant of Semi-Persistent scheduling, comprises:
monitoring, by the network device, resources of a grant with the largest index or the smallest index among the current N grants of Semi-Persistent scheduling.

10. The method according to claim 9, wherein the method further comprises:
monitoring, by the network device, resources of a current grant of dynamic scheduling to obtain new data transmitted by the user equipment through the current grant of dynamic scheduling when the HARQ buffer is empty and there is the current grant of dynamic scheduling.

11. The method according to claim 9, wherein when there are currently N grants of Semi-Persistent scheduling, and the N is an integer greater than 1, the monitoring, by the network device, the resources of the one current grant of Semi-Persistent scheduling, comprises:
monitoring, by the network device, resources of a grant with the largest transmission block size (TBS) among the current N grants of Semi-Persistent scheduling.

12. The method according to claim 9, wherein the method further comprises:
monitoring, by the network device, resources of a current grant of dynamic scheduling to obtain data that needs to be retransmitted transmitted through the current grant of dynamic scheduling when the HARQ buffer is not empty and the grant of dynamic scheduling of a current transmission time interval (TTI) has a New Data Indicator (NDI) that is not toggled.

13. A network device, comprising one or more processors, one or more memories, one or more transceivers, and one or more programs;
wherein the one or more programs are stored in the one or more memories, and configured to be executed by the one or more processors; and
the programs comprise instructions for performing the acts in the method according to claim 9.

14. A non-transitory computer-readable storage medium, wherein the non-transitory computer-readable storage medium stores a computer program for electronic data interchange, wherein the computer program enables a computer to perform the method according to claim 9.

15. A user equipment, comprising one or more processors, one or more memories, one or more transceivers, and one or more programs;

wherein the one or more programs are stored in the one or more memories, and configured to be executed by the one or more processors; and the one or more programs comprise instructions for performing following acts:

when a hybrid automatic repeat request (HARQ) buffer is not empty, selecting an uplink resource grant used for previous data transmission to transmit data that needs to be retransmitted; or, when the HARQ buffer is empty, according to a carrier access manner allowed by the user equipment, selecting one current grant of Semi-Persistent scheduling to transmit new data or multiple current grants of Semi-Persistent scheduling to transmit new data, wherein the according to the carrier access manner allowed by the user equipment, selecting one current grant of Semi-Persistent scheduling to transmit new data or multiple current grants of Semi-Persistent scheduling to transmit new data, comprises:

when the HARQ buffer is empty, there are currently N grants of Semi-Persistent scheduling, and the user equipment is not allowed to use a non-single carrier access manner, selecting one of the N grants of Semi-Persistent scheduling to transmit new data, wherein the N is an integer greater than 1; and when the HARQ buffer is empty, there are currently N grants of Semi-Persistent scheduling, and the user equipment is allowed to use a non-single carrier access manner, selecting multiple grants among the N grants of Semi-Persistent scheduling to transmit new data.

16. The user equipment according to claim 15, wherein the selecting one of the N grants of Semi-Persistent scheduling to transmit new data comprises:

selecting one grant with the largest transmission block size (TBS) among the N grants of Semi-Persistent scheduling to transmit new data.

17. The user equipment according to claim 15, the programs further comprise instructions for performing a following act:

when the HARQ buffer is empty and there is currently a grant of dynamic scheduling, selecting the current grant of dynamic scheduling to transmit new data.

* * * * *